UNITED STATES PATENT OFFICE.

ARTHUR ASHWORTH, OF BURY, ENGLAND.

MANUFACTURE OF REDUCING AGENTS.

997,534. Specification of Letters Patent. Patented July 11, 1911.

No Drawing. Application filed October 28, 1908. Serial No. 459,941.

*To all whom it may concern:*

Be it known that I, ARTHUR ASHWORTH, citizen of Great Britain, residing at Ebor House, in the city of Bury, in the county of Lancashire, England, have invented certain new and useful Improvements in the Manufacture of Reducing Agents; and I do hereby declare the following to be a full, clear, and exact description of the invention, such as will enable others skilled in the art to which it appertains to make and use the same.

My invention relates to that class of reducing agents formed from sulfur dioxid, $SO_2$, by the use of zinc dust. The hydrosulfites or the other compounds of sulfur formed from sulfur dioxid or sulfurous acid are well known reducing agents but a great disadvantage hitherto connected with their use has been their instability at ordinary temperatures or when heated or the inconvenience of working with same under the conditions heretofore necessary with their employment.

I am aware that various methods have been tried to produce a satisfactory reducing agent by acting with sulfur dioxid upon zinc dust by means of formaldehyde or other reagents which are introduced to lend stability to the compound formed by the action of sulfur dioxid on zinc dust but I have obtained the most satisfactory results in the manner described below.

I act upon zinc dust with dry gaseous sulfur dioxid, $SO_2$, in the presence of glycerin, or glucose diluted either with water or diluted with a solution of zinc chlorid or calcium chlorid in water. An example of my exact procedure is as follows:—In a suitable closed vessel which can be kept at the proper temperature by means of a water jacket, I introduce a well stirred mixture of twenty pounds zinc dust, fifteen pounds glucose and twenty pounds of a solution of a hygroscopic salt such as twenty pounds of a calcium chlorid or zinc chlorid solution containing about 45% dry calcium chlorid or zinc chlorid respectively. Into this mixture twenty-nine pounds of dry gaseous sulfur dioxid, $SO_2$, is gradually introduced until the zinc dust has disappeared. The heat resulting from this reaction is kept by means of the water jacket at from 50 to 55 degrees C. during the operation. The final product is a thick grayish paste which can be used directly for printing and dyeing purposes and which possesses the property of reducing indigo at low temperatures.

It is, of course understood that the above proportions may be varied from without departing from the spirit of my invention. Instead of glucose, glycerin, molasses or any variety of dextrin may be employed.

As an example of how the product is used in printing as a reducing agent or discharge, I take of this new reducing agent 40 grams, dry British gum 30 grams, water 10 grams, turpentine 10 grams. I heat this mixture up to 40 degrees C. and when cold add five grams of bisulfite of soda. I then print and after drying pass through a steam ager which is supplied with moist steam at a temperature of from 102 to 103 degrees C. My product will reduce an equivalent weight of indigo carmine at ordinary temperatures.

What I claim is:—

1. The process of manufacture of a reducing agent by adding dry sulfur dioxid to a mixture of zinc dust, a saccharine compound and a solution of a hygroscopic salt.

2. The process of manufacture of a reducing agent by adding sulfur dioxid to a mixture of zinc dust, glucose and a solution of a hygroscopic salt.

3. The process of manufacture of a reducing agent by adding sulfur dioxid to a mixture of zinc dust, glucose and a solution of calcium chlorid.

4. The process of manufacture of a reducing agent by adding sulfur dioxid to a mixture of zinc dust, glucose and a solution of calcium chlorid containing about 45% dry calcium chlorid.

5. The process of manufacture of a reducing agent by adding twenty-nine pounds of sulfur dioxid to a mixture of twenty pounds zinc dust, fifteen pounds glucose and twenty pounds of a solution of calcium chlorid containing about 45% dry calcium chlorid.

6. The process of producing a reducing agent by adding to a mixture of twenty pounds zinc dust, fifteen pounds glucose, twenty pounds calcium chlorid solution, twenty-nine pounds sulfur dioxid at a temperature of from 50 to 55 degrees C.

7. The process of producing a reducing agent by adding to a mixture of zinc dust, glucose and a solution of calcium chlorid, sulfur dioxid at a temperature of from 50 to 55 degrees C.

8. The process of producing a reducing agent by adding sulfur dioxid to a mixture of zinc dust, glucose and calcium chlorid, the reaction being controlled by a temperature of from 50 to 55 degrees C.

In testimony whereof I affix my signature in presence of two witnesses.

ARTHUR ASHWORTH.

Witnesses:
 HUGO MOCK,
 HARRY C. ADAMS.

Copies of this patent may be obtained for five cents each, by addressing the "Commissioner of Patents, Washington, D. C."